US00RE38836E

(19) United States
(12) Reissued Patent
Krause et al.

(10) Patent Number: US RE38,836 E
(45) Date of Reissued Patent: Oct. 18, 2005

(54) CABINET SYSTEM

(75) Inventors: Helge Krause, Prieros (DE); Hans-Peter Welke, Berlin (DE)

(73) Assignee: M3 Gesellschaft fur modulare Einrichtungsysteme mbH, Waldstadt (DE)

(21) Appl. No.: 10/286,569

(22) Filed: Nov. 1, 2002

Related U.S. Patent Documents

Reissue of:
(64) Patent No.: 6,267,462
Issued: Jul. 31, 2001
Appl. No.: 09/274,466
Filed: Mar. 22, 1999

(30) Foreign Application Priority Data

Mar. 20, 1998 (DE) ..... 298 05 662

(51) Int. Cl.[7] ..... F16B 12/14; A47B 87/02
(52) U.S. Cl. ..... 312/111; 312/108
(58) Field of Search ..... 312/107, 108, 312/109, 107.5, 111, 257.1, 351.1, 351.3, 138.1, 326, 329; 16/DIG. 33

(56) References Cited

U.S. PATENT DOCUMENTS

| | | | | | |
|---|---|---|---|---|---|
| 243,405 | A | * | 6/1881 | Rush | 16/DIG. 33 X |
| 2,011,962 | A | * | 8/1935 | Wheatley | 312/111 X |
| 2,935,288 | A | * | 5/1960 | Summerer | 312/351.1 X |
| 3,329,473 | A | * | 7/1967 | Dickson | 312/111 X |
| 3,563,624 | A | * | 2/1971 | Stice | 312/111 |
| 3,743,372 | A | * | 7/1973 | Ruggerone | 312/108 |
| 3,807,572 | A | * | 4/1974 | Luvara et al. | 312/108 X |
| 3,822,924 | A | * | 7/1974 | Lust | 312/108 X |
| 5,383,722 | A | * | 1/1995 | Chen | 312/138.1 X |
| 5,466,058 | A | * | 11/1995 | Chan | 312/111 |
| 5,524,977 | A | * | 6/1996 | Orawski | 312/138.1 X |
| 5,791,727 | A | * | 8/1998 | Doescher et al. | 296/190 |
| 5,810,505 | A | * | 9/1998 | Henriott et al. | 312/111 X |

FOREIGN PATENT DOCUMENTS

| | | | | |
|---|---|---|---|---|
| GB | 1435738 | * | 5/1976 | 312/111 |
| GB | 2230434 | * | 10/1990 | 312/108 |

* cited by examiner

*Primary Examiner*—James O. Hansen
(74) *Attorney, Agent, or Firm*—Norris McLaughlin & Marcus PA

(57) ABSTRACT

A modular cabinet system is disclosed whereby a number of modules can be combined to form a unique cabinet configuration. Each module may be an accessory, such as a lamp or cable duct, or a storage compartment. The storage compartment may be configured as a square or rectangular box with one open side and side walls made of a multiplex. Each side wall has at least one system hole and at least one system thread positioned so that the holes and threads of one module line up with the holes and threads of another module for assembly. The pre-existing system holes and threads allow the modules to be separated and combined repeatedly without damage.

13 Claims, 12 Drawing Sheets

CABINET SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a cabinet system comprising combinable components for forming variants for universal usage, more particularly for various office room forms such as cell, group, or combined offices.

The known cabinet systems consisting of combinable components comprise a multiplicity of components which have several width and height dimensions within a defined modular pattern to be assembled to form the cabinet systems desired. In these systems, upper and lower cabinets, sideboards, highboards and the like are defined as such and can only be used and/or assembled in accordance with this distinct function. Very often, the single parts can only be combined after drilling additional holes directly into the furniture board. Disassembling or reassembling of the combined parts is possible only in a limited way and often damages the surface visibly and permanently. It is an objective of the present invention to provide a cabinet system which avoids the disadvantages of the known prior art and which ensures that a multiplicity of variants may be formed using only a small number of different components not being restricted to one function only, wherein these variants may be adapted as often as desired to match changing office room forms or office requirements.

SUMMARY OF THE INVENTION

The particular advantages of the arrangement of system holes and system threads in the carcass surfaces of components differing only in their width and height, according to the present invention, lie in the fact that

- it is possible to arrange the components to form variants as often as desired without further drilling, doweling, screwing into the carcass surfaces, covering of holes and the like,
- it is possible to expand a basic arrangement in upward, downward, left or right directions as desired and even to use the components in a position rotated around their own axes,
- a precisely matching and unrestricted joining of the system components is ensured.

The system holes according to the present invention used to join the components by joining screws and sleeve nuts are unambiguously determined as regards their position and number on the carcass sides. Also, the number and position of the system threads in one of the carcass sides are precisely determined.

The components are manufactured of a compact board consisting of multiplex, having a thickness of 12.0 mm for example, as support material being coated on both surface sides with HPL at a thickness of, for example, 0.8 mm. The seven-fold lengthwise and transverse bonding of the single veneer sheets of the multiplex ensures excellent stability of the carcasses. Moreover, this counteracts to the inclination of the wood to deform due to humidity changes.

All carcass parts are produced using a CNC machine. In this manner, tolerances of ±0.2 mm are achieved for the system holes, system threads, hole rows, the three-hole configuration for the door stops as well as all millings, etc. The carcass parts are designed to divert the tolerances of the support material and the coating to the inside. As regards the outer dimensions, only negative tolerances up to a maximum of 0.4 mm are permitted.

Surprisingly, it has been found that the use of multiplex material and the limitation to certain outer dimensions of the components assembled in the aforementioned way makes possible the observation of tolerance chains which otherwise are only possible in steel construction work and had never been achieved hitherto in wood furniture production and which provide a precondition for the modular system according to the present invention.

The carcass parts are appropriately cut mitred (45°) and pressed to form a carcass using angle dowels commercially available. Due to the relatively thin compact board and the tolerances to be observed, this work requires utmost precision.

The system hole having a diameter of 10.0 mm, for example, is of decisive importance. All joints occurring during the assembly as well as the inclusion of additional parts such as cover panels, screens, wardrobe bars, lamps, bases, cable ducts, CPU stands, drawing roll stands, support angles, steel handles for component joining, sliding aids, inter-component connectors and component-screen connectors are made possible by means of the system holes.

The system threads are produced using riveted bushings which are generally inserted into the bottom of the carcasses to accommodate footpieces or bases. The height of the bases as well as the footpieces may be adjusted by pushing an Allan key through the system threads.

BRIEF DESCRIPTION OF THE DRAWINGS

The present invention will now be explained in more detail with reference to a drawing of an example embodiment of a cabinet system.

DESCRIPTION OF THE PREFERRED EMBODIMENT

The cabinet system is formed of three different components 1, 2, and 3. In accordance with the illustrations shown in FIGS. 1 through 3, the cabinet system has three different carcass width W and height H dimensions having an equal depth D of, for example, 350 mm.

Figure 1:
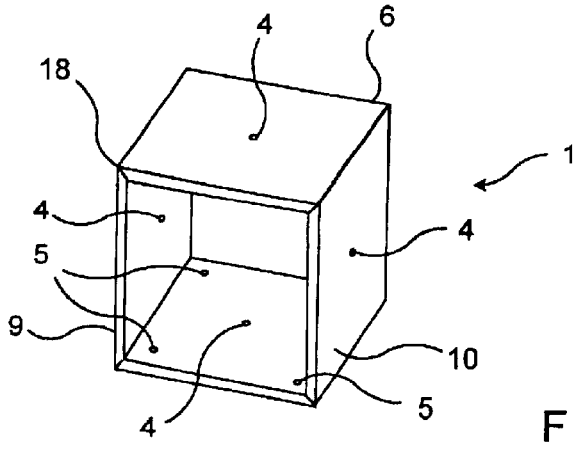
FIG. 1 shows a perspective front view of the first system components.
Figure 2:
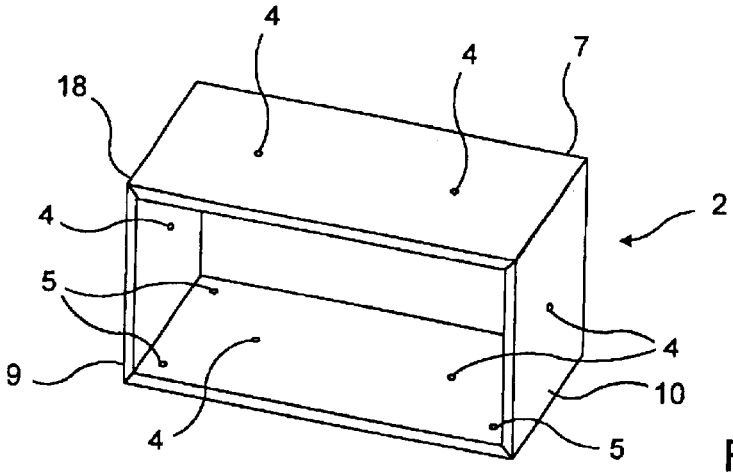
FIG. 2 shows a perspective front view of the second system components.
Figure 3:
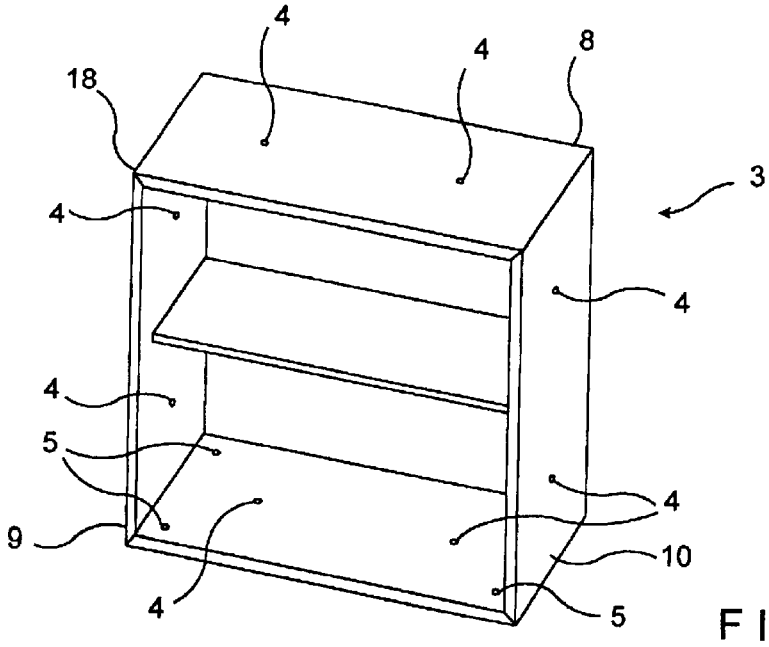
FIG. 3 shows a perspective front view of the third system components.

The dimensions of component 1 according to FIG. 1 are W1×H1×D=350 mm ×350 mm×350 mm, of component 2 according to FIG. 2 W2×H2×D=700 mm×350 mm×350 mm, and of component 3 according to FIG. 3 W3×H3×D= 700 mm×700 mm×350 mm.

Due to these basic dimensions and appropriate additional elements and due to the system holes 4 very precisely defined as to their position and number and the system threads 5 also very precisely defined as to their position and number, it is possible for the first time to furnish frequently changing office room forms or to meet changing office requirements as desired without further drilling, doweling, or screwing into the carcass walls.

The rear walls 6, 7, and 8 are formed as rear walls fixed in grooves.

In accordance with the illustration shown in FIG. 1, each carcass side of component 1 is provided with one system hole 4, i.e. a total of four system holes, while the carcass side forming the bottom side of the carcass is provided with four system threads 5. The system thread 5 is a metallic internal thread fitted in a hole.

In accordance with the illustration shown in FIG. 2, each carcass side of component 2 is provided with two system holes 4, i.e. a total of eight system holes, while the carcass side forming the bottom side of the carcass is provided with four system threads 5.

The unified depth T of 350 mm of the components 1, 2, and 3 uses the available space very economically due to the standardized dimensions of office means such as ring binders if used in cell offices complying with DIN 4543. An extremely large accommodation space and an economic utilization of the available area is achieved. Optimum accessibility is ensured by the optimized height. Six ring binder heights require a cabinet height of only 2.10 m, eight ring binder heights a cabinet height of only 2.80 m. Using basic accessories, this arrangement can be further joined to other components in 30 upward, downward, left and right directions as desired using the system holes 4.

When used in a group office, four ring binder heights are achieved at a cabinet height of 1.40 m so that each building authority will approve this arrangement as a group solution. The arrangement of the components 1, 2, and 3 divides the room an can be rotated relative to the working desks as desired.

When used in a combined office, the advantages of the aforementioned office types are combined in an ideal manner.

The support material of the carcass walls is multiplex provided with a coating 10 made of HPL as coating material. The rear walls 6, 7, 8 may for instance be coated with melamine resin.

Figure 4:
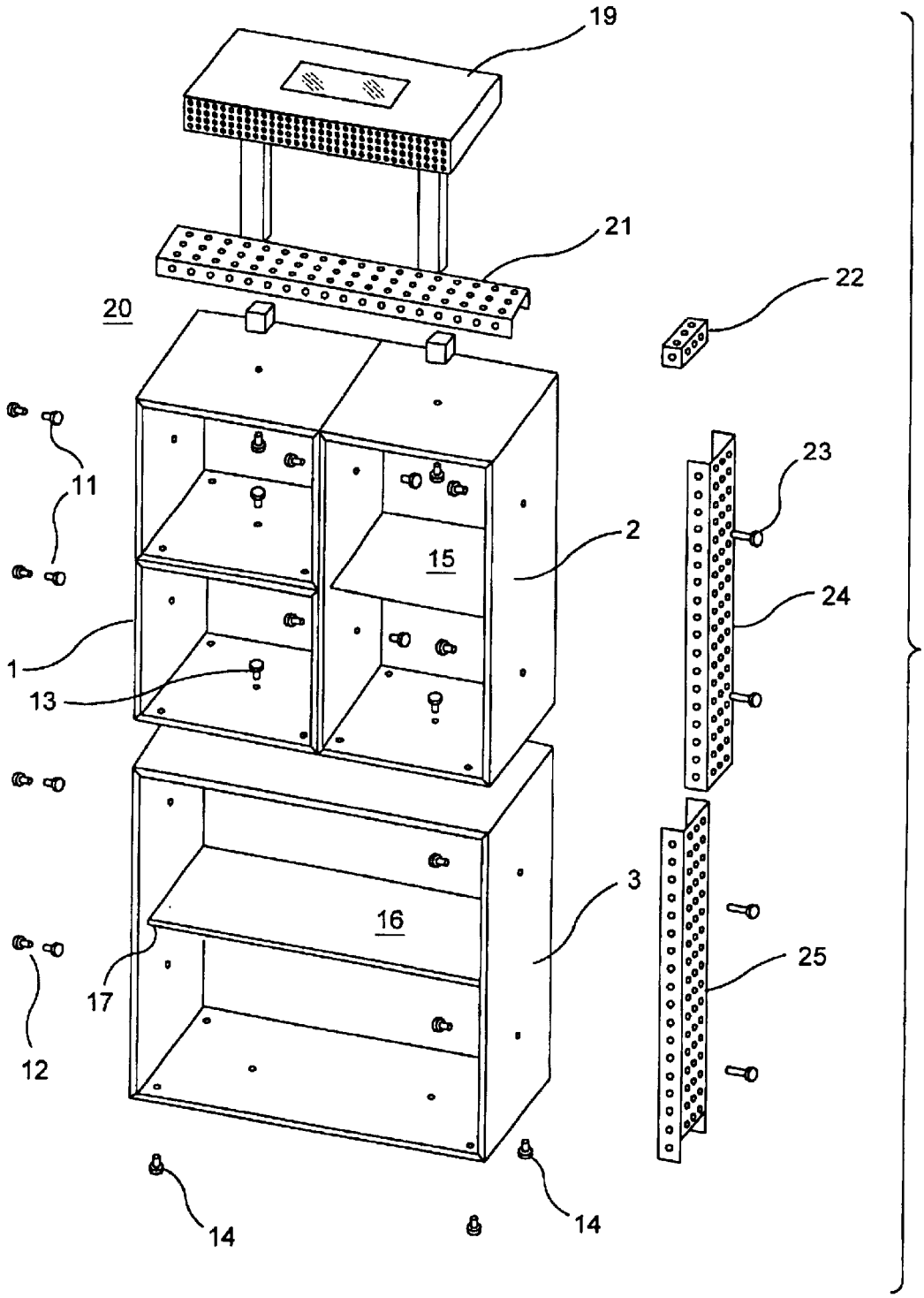
FIG. 4 shows an exploded view of a cabinet system comprising additional elements.
Figure 5:
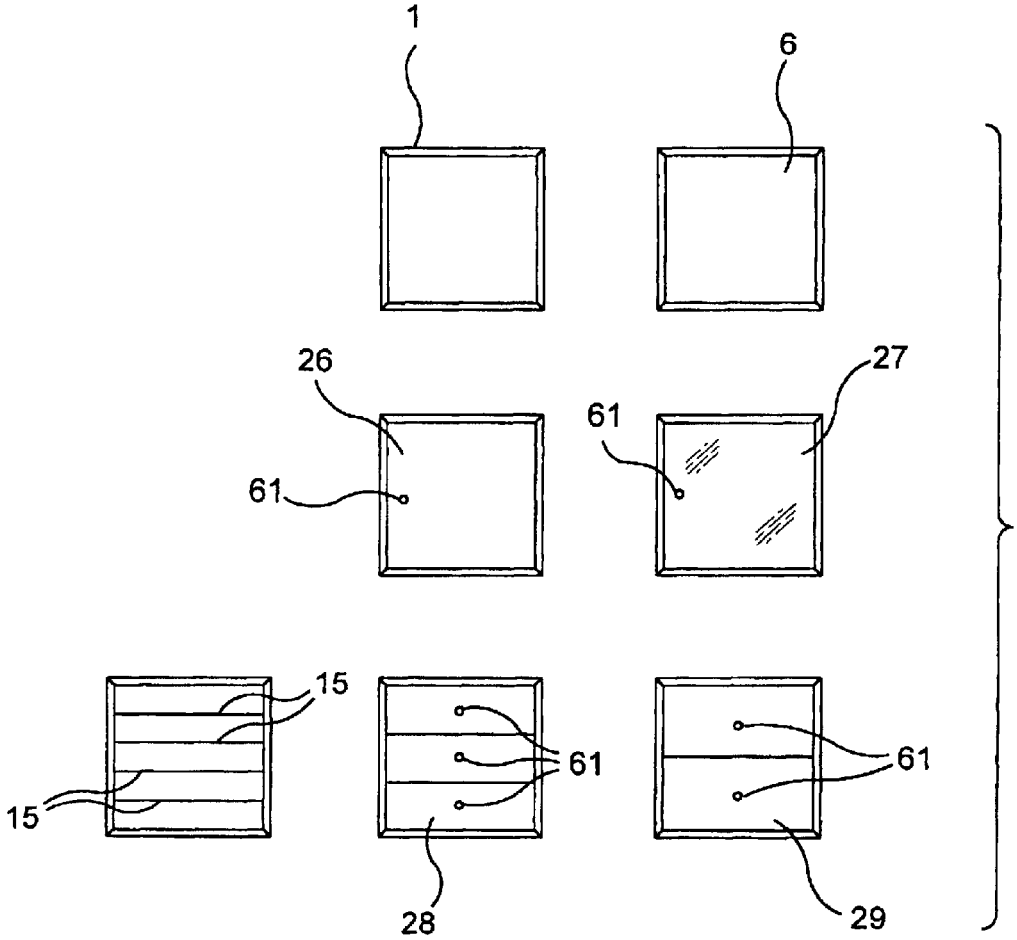
FIG. 5 illustrates the forming of variants in the component according to FIG. 1.
Figure 6:
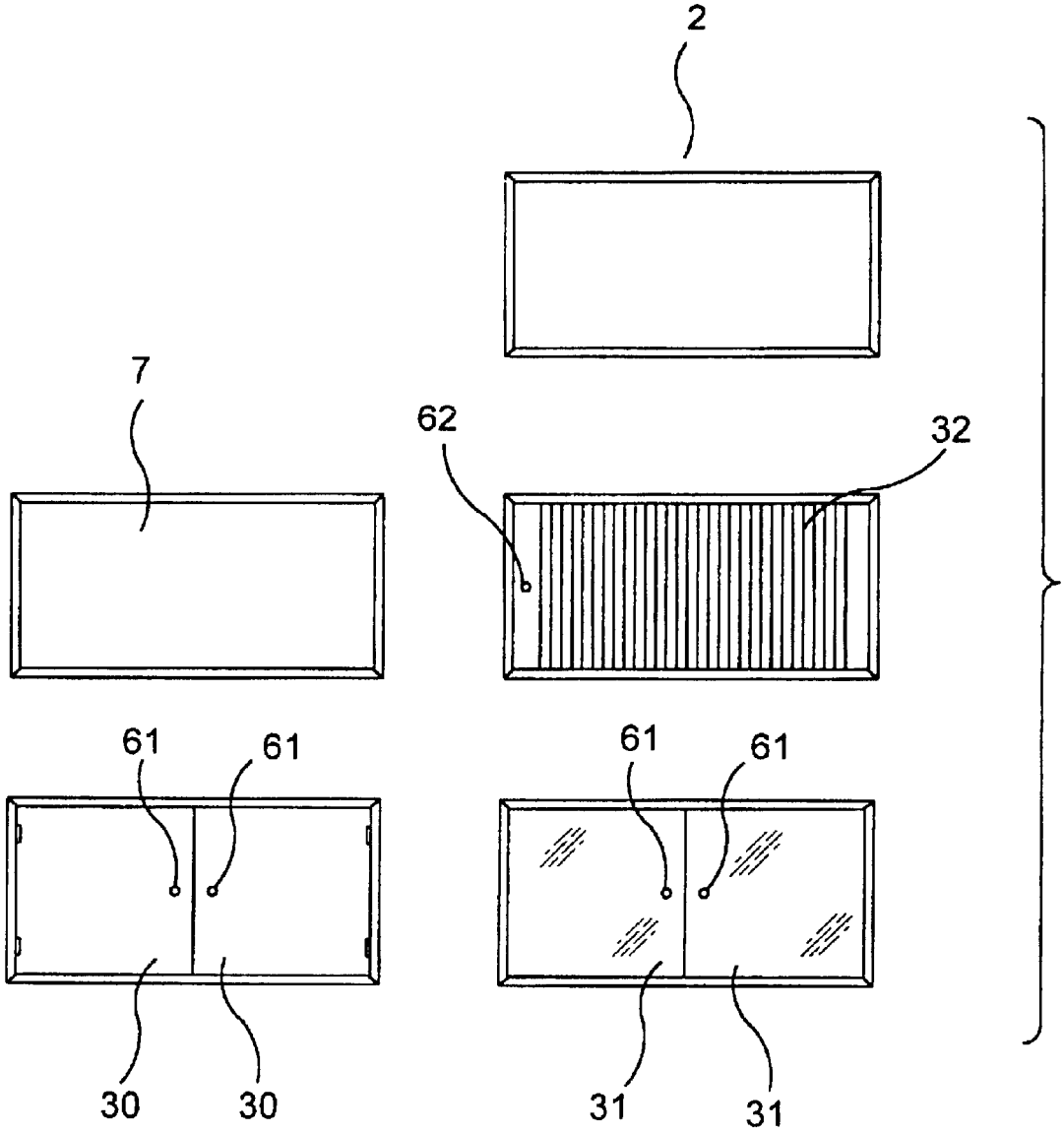
FIG. 6 illustrates the forming of variants in the component according to FIG. 2 in horizontal position.
Figure 7:
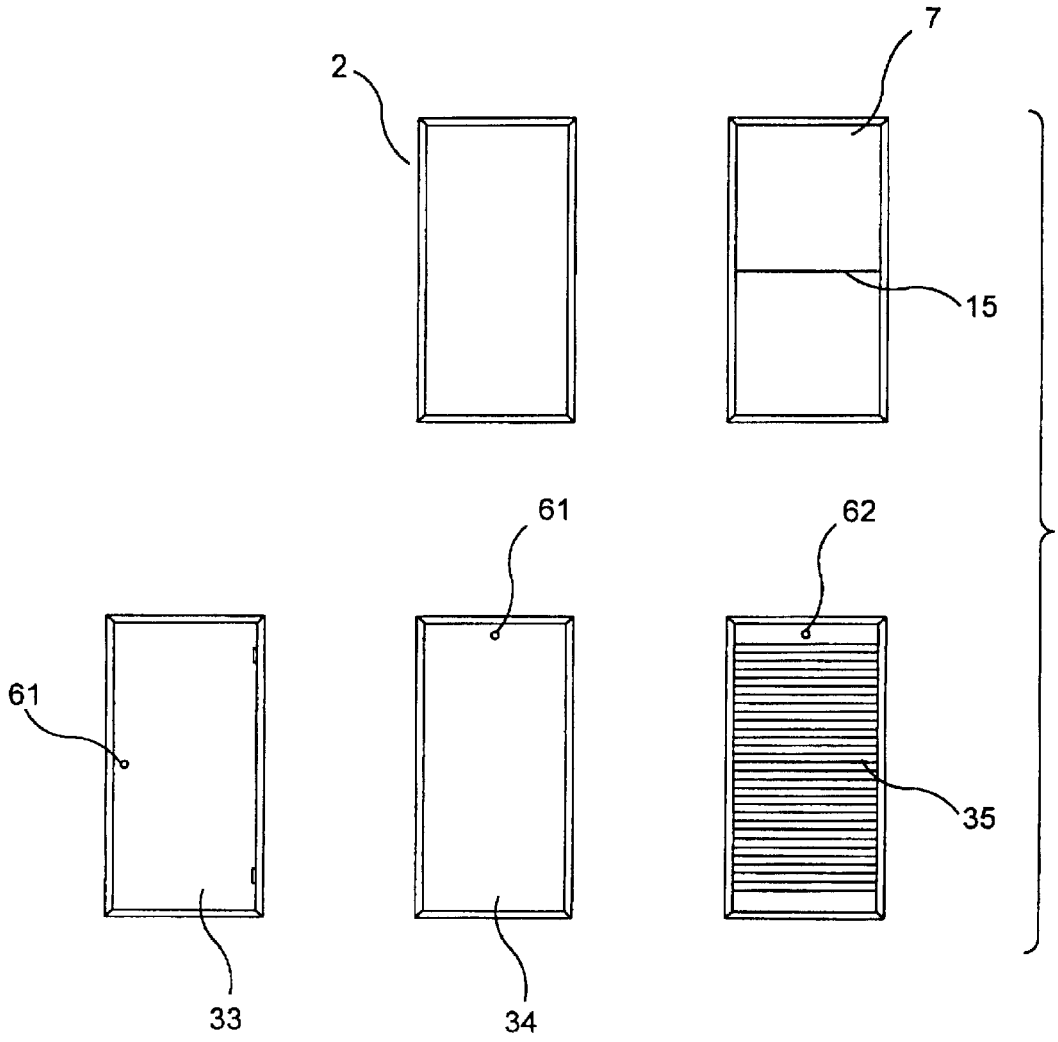
FIG. 7 illustrates the forming of variants in the component according to FIG. 2 in vertical position.
Figure 8:
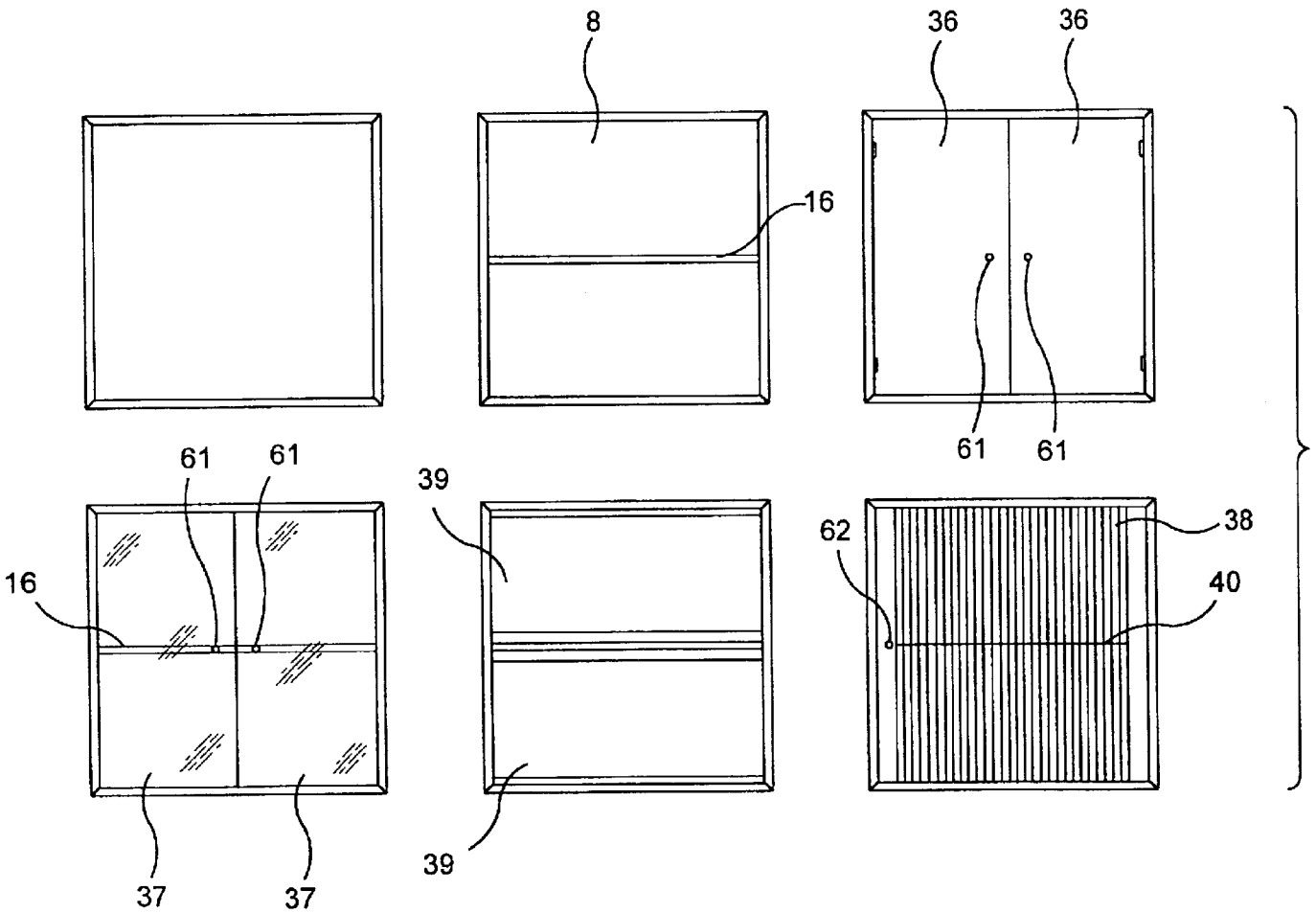
FIG. 8 illustrates the forming of variants in the component according to FIG. 3.

FIG. 4 shows an exploded view of an example arrangement of a cabinet system comprising two components 2 according to FIG. 2 and one component 3 according to FIG. 3 in connection with additional elements such as a lamp 19, cable ducts 21, 22, 24, 25, footpieces 20 for lamp 19, and steel compartment bottom plates 15 and 16. The additional elements and the components 2 and 3 are joined together via the system holes 4 using short connecting screws 13 with sleeve nuts 11. Unused system holes 4 may be covered by cover screws 12 and sleeve nuts 11. The cable ducts 21, 22, 24, 25 are joined with the components 2, 3 via the system holes 4 using the long connecting screws 23. Footpieces 20 are used in a known manner to ensure the distances required. The same applies to compartment bottom supports 17 for supporting the steel compartment bottom plates 15 and 16.

If required, height adjustment screws 15 are screwed into the system threads 5 of the carcass wall forming the bottom plate, or coasters 57 are inserted into the system threads 5 to provide a movable unit.

The FIGS. 5 through 8 show different variants of arranging the components 1, 2, 3 according to FIGS. 1 through 3, said variants being characterized in that within the carcass dimensions W1/H1/D or W2/H2/D or W3/H3/D drawer modules 28, 29, steel compartment bottom plates 15 (as mail distribution system or shelf arrangement), a paired revolving door 30 or a blind 32, 35, 38 are arranged.

The blind cabinets are provided with milled guidance rails made of plastic material having narrow radiuses for optimum utilization of the inner spaces of the carcass and with an additional separating wall as sight blind and for accommodating hole rows 41 for inserting the shorter blind steel compartment bottom plates 40. The system holes 4 located behind the separating wall are equipped with threaded bushings for joining purposes. All blind cabinets are lockable.

The door handles 61 for all revolving doors 26, 33 and/or paired revolving doors 30, 36 and revolving glass doors 37 and/or paired revolving glass doors 31, 37 as well as the drawer modules 28, 29 are specifically designed to match the cabinet system. As regards the keys for the blind cabinet locks, the heads are cut off, the keys are bonded into the handles and used as key handles 62.

At the end of a carcass chain, the system holes 4 facing outward are covered by cover screws 12. As the compact plate of which the carcasses are made has a thickness of, for example, 13.6 mm and such thin material has hardly been used in furniture production up to now, a cover screw is not a standard part but must be specifically manufactured.

The lamp 19 must also be specifically manufactured to match the cabinet system and may be provided with HQI or fluorescent tubes. The footpieces of the lamp 19 are arranged at a distance of 350 mm in order to be exactly screwed into two system holes 4. The footpieces 20 maintain the distance of the cable ducts 21, 24 so that the lamp 19 is supported by the components 1, 2, 3 and not a cable duct 21, 24. The power supply is provided via the respective cable channel 21, 22, 24, 25.

Figure 9:
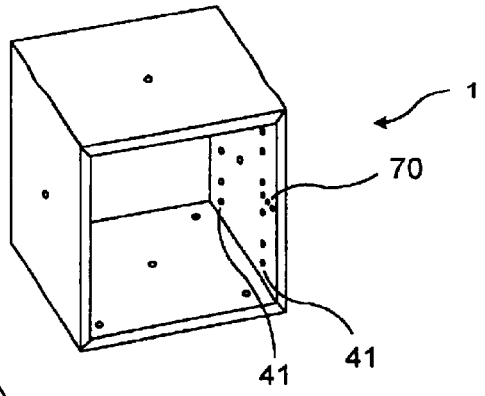
FIG. 9 shows the hole rows in a perspective view of the component according to FIG. 1.
Figure 10:
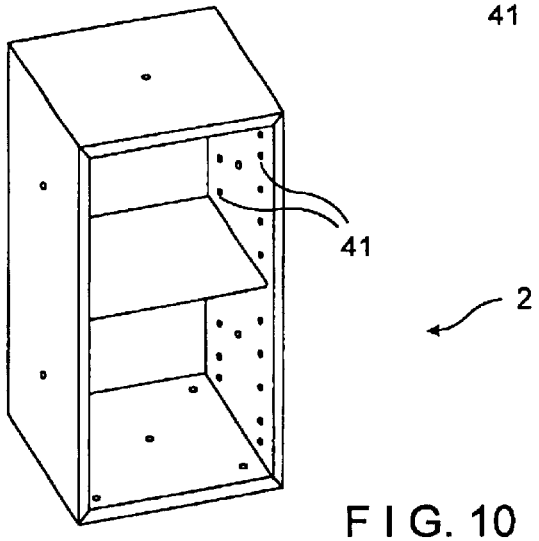
FIG. 10 shows the hole rows in a perspective view of the component according to FIG. 2.
Figure 11:
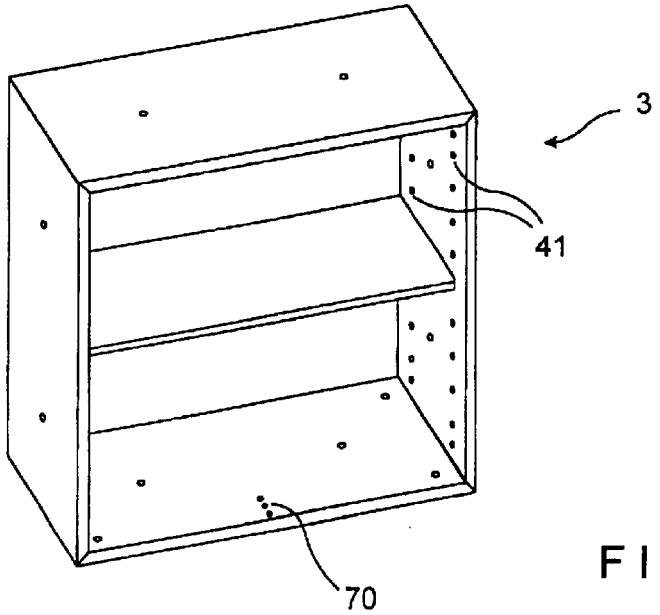
FIG. 11 shows the hole rows in a perspective view of the component according to FIG. 3.

FIGS. 9 through 11 show the hole rows 41 and the three-hole arrangement 70 for the door stops. The hole rows 41 having a hole diameter of approx. 3.0 mm serve to support steel compartment bottom plates 15, 16, 40 or slanting compartment bottom plates 39 and hinge plates. Their dimensions and distances are adapted to match inner doors and the measure chains of the carcasses of the components 1, 2, 3. Thus, a component 1 may hold up to four steel compartment bottom plates 15, a component 2 up to four steel compartment bottom plates 16 horizontally and up to nine steel compartment bottom plates 15 vertically, a component 3 up to nine steel compartment bottom plates 16 or up to four slanting compartment bottom plates 39 using a compartment bottom plate support 17. The holes in the hole rows 41 are arranged so that hinge plates for wooden as well as glass doors may be fixed onto the carcasses. The components 1 and 2, vertical, allow without any problems to have the revolving doors 26, 33 or the revolving glass door 27 stop at the left or the right side. Even a later exchange of the stop direction is possible without damaging the carcass. As regards carcasses without rear walls (open), a revolving door 26, 33 or paired revolving doors 30, 36 made of wood and revolving glass doors 27 or paired revolving glass doors 31, 37 may be fixed without limitations opposite the front doors.

Drawer modules 28, 29 are also fixed using the hole rows 41.

The three-hole arrangement 70 for the door stops is designed so that one door stop may be used with the inner revolving doors 26, 33 or paired revolving doors 30, 36 as well as revolving glass doors 27 or paired revolving glass doors 31, 37 irrespective of the different door thicknesses. In such cases, the two front holes are used for glass door stops and the two rear holes for wooden door stops. The door stop 60 consists of solid rubber and is designed for use in the three-hole arrangement 70. It is dimensioned so that it hardly becomes an obstacle when, for example, ring binders are put into the carcass.

Figure 12:
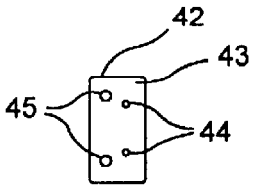
FIG. 12 shows a footpiece for the cabinet system.

FIG. 12 shows a footpiece for the components 1, 2, 3 which is formed as a so-called reversible footpiece 42. The reversible footpiece 42 serves to provide a distance between the floor and the furniture system. It has the same system height as a base 69 or a coaster roller 57. It comprises a steel base plate 43, two passage holes 44 having a diameter of approx. 10.0 mm for mounting the reversible footpiece 42 on the system threads 5, and two adjusting feet 45 the height of which can be adjusted by means of stationary thread bolts. As the feet 45 are not arranged on the same axis as the passage holes 44, the reversible footpiece 42 can be mounted in one of two different positions. Either the adjusting feet 45 are positioned at the outer carcass edge (if a carcass stands separately or as the last piece in a chain), or they are turned to the inside. Thus, it is prevented within a chain that two adjusting feet 45 are positioned directly side by side.

The adjusting feet 45 may also be screwed directly into the system threads 5. They serve to adjust the height if no roller coasters 57, bases 69 or reversible feet 42 are mounted beneath the carcasses. They are provided with a hexagon plastic foot and a hexagon socket at their ends. As in case of the adjusting feet 45 being completely screwed in, the bolt must not be screwed through the system thread 5, only a height compensation of approx. 10 mm maximum is possible. This also applies to the screw-in bolt of the inserted roller coasters 57 made of plastic material.

Figure 13:
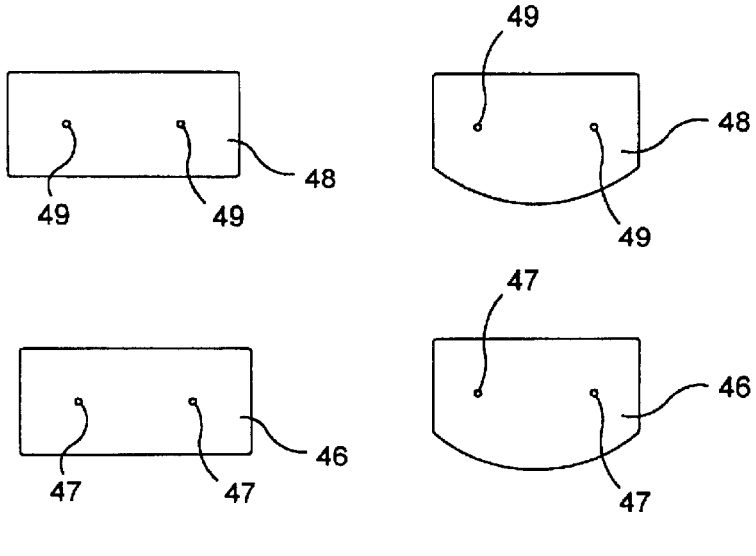
FIG. 13 shows cover panels for the components.

The components 1, 2, 3 may be covered by cover panels 48 or glass cover plates 46 as shown in FIG. 13. The cover panels 48 may consist of a wide variety of materials (lacquered, veneered, melamine resin coated cover panels as well as mineral and glass cover plates 46). Cover panels made of any material except glass are provided with bond-in bushings 49 at the appropriate positions. As the holes for the bushings do not penetrate the panels, the surfaces of the cover panels 48 are not damaged. As regards the glass cover plates 46, screws 47 are bonded to the bottom side so that the fit exactly into the system holes 4 to be screwed tight from the inside using the sleeve nuts 11.

Figure 14:
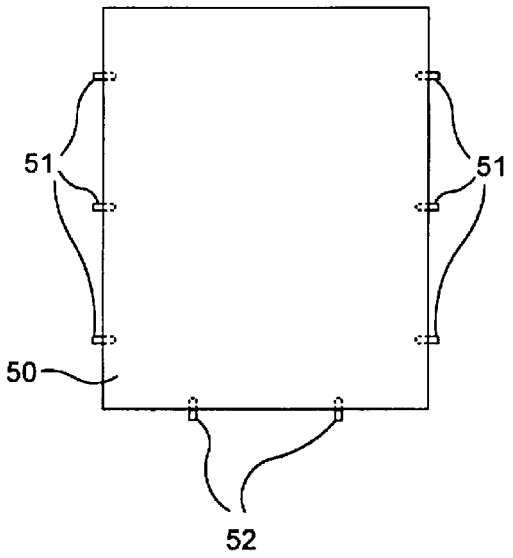
FIG. 14 shows a screen to be joined to the components.

FIG. 14 shows as an additional element a screen 50 which is joined with the system holes 4 via a connecting thread 51 and which may be provided with adjusting feet 45 by means of foot threads 52.

In the remaining figures, further additional elements are shown which may be joined with the components 1, 2, 3 via the system holes 4 and/or system threads 5.

Figure 15:
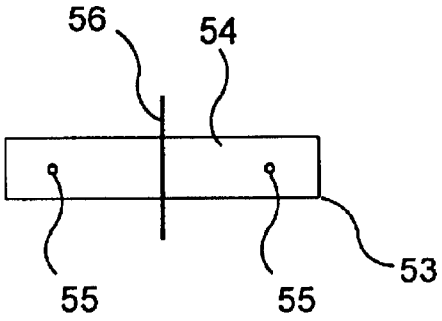
FIG. 15 shows a front view of an additional means for wardrobe support.
Figure 16:
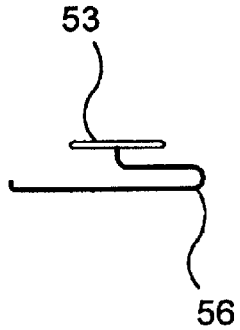
FIG. 16 shows a side view of an additional means for wardrobe support.

FIGS. 15 and 16 show an arrangement for suspending wardrobe pieces, comprising a steel base plate 54 having two passing holes 55 having a diameter of, for example, 10 mm and being spaced from each other at a distance of 350 mm to be fixed in two system holes 4 or in two bond-in bushings 49 of a cover panel 48 or a glass cover plate 46 and a curved round steel bar 56 across the carcass front for suspending coat hangers.

Figure 17:
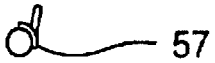
FIG. 17 shows a roller coaster footpiece.
Figure 18:
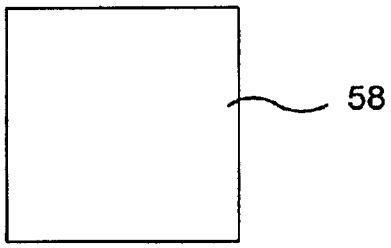
FIG. 18 shows an acoustic rear panel.

FIG. 17 shows the coaster rollers 57 mentioned earlier while FIG. 18 shows an acoustic rear wall 58.

Figure 19:
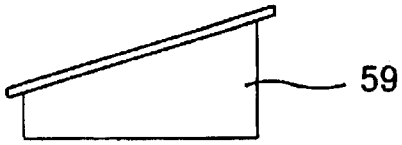
FIG. 19 shows a high desk placeable on the components.

FIG. 19 shows a detachable high desk top 59 to be screwed into the system holes 4.

Figure 20:
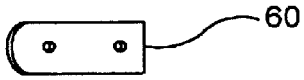
FIG. 20 shows a door stop.
Figure 21:
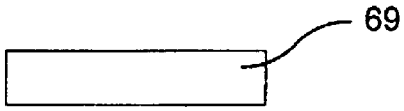
FIG. 21 shows a base for the cabinet system.

The door stop 60 mentioned earlier is shown in FIG. 20 while FIG. 21 shows a front view of the base 69 mentioned earlier.

Figure 22:
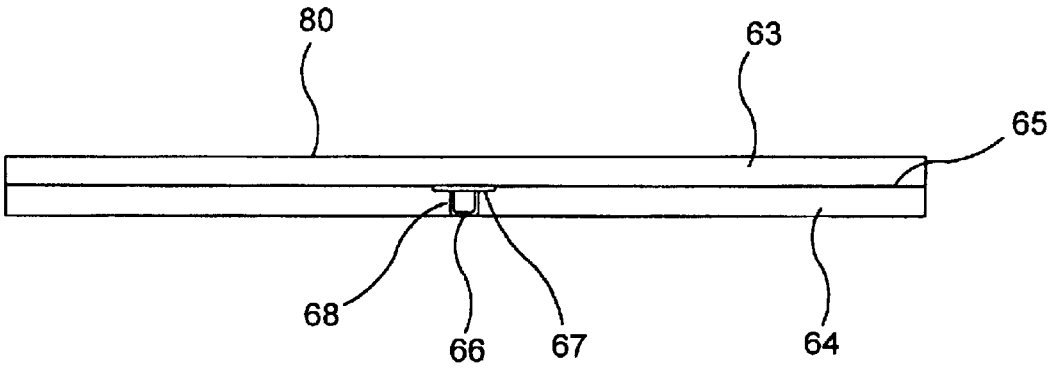
FIG. 22 shows a sectional view of a table plate joinable with the components.

FIG. 22 shows a sandwich board 80 which may be used as a table board. It comprises an upper plate 63 without holes and a lower plate 64 provided with holes 66 and matching head millings 67. The holes 66 and the head millings 67 are formed so that standard push-in bushings 68 may be driven in. After bonding the upper plate 63 with the lower plate 64 by an adhesive layer 65 the push-in bushings 68 gain such stability that all necessary functions below the table may be performed, such as fixing legs in a wide variety of positions, joining with system carcasses, fixing a notch structure, plate connectors, cable ducts 21, 22, 24, 25, CPU stands 71, waste-paper baskets, keyboard drawer plates, a third level, etc. Beside the standard positioning of a multiplicity of push-in bushings 68 on the lower plate 64 allowing joining with the system carcasses via the system holes 4 at the matrix distances as well as with footpieces or usual additional elements, this system of course always allows a fast response to changes or individual customer's wishes. In such cases, the lower plate 64 may be provided from the beginning with the required holes using the CNC processing machine and with the push-in bushings 68 which are necessary to position the additional elements desired by the customer at their proper places. Any commercially available material may be used as plate material.

Figure 23:
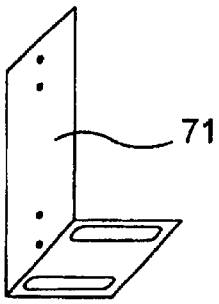
FIG. 23 shows a CPU stand.

A CPU stand 71 as shown in FIG. 23 is an angled piece of sheet metal having, for example, a width of 250 mm and being provided with 2×2 passage holes spaced at a distance of 350 mm for being fixed in two system holes 4 on the one leg and with two long holes having a width of 7.0 mm on the other. Thus, the CPU stand 71 may also be turned and used as plate support.

Figure 24:
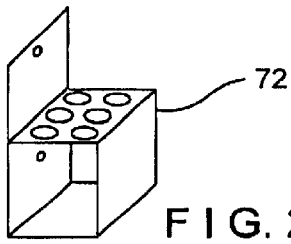
FIG. 24 shows a drawing roll stand.

FIG. 24 shows a drawing roll support 72. The drawing roll support 72 is also made of sheet metal and fixed in two system holes 4 using appropriate holes. It may hold, for example, six drawing rolls.

Figure 25:
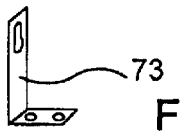
FIG. 25 shows a support angle.

The supporting angle 73 according to FIG. 25 is provided on one leg with a passage hole having a diameter of approx. 10.0 mm spaced from the angle point at a distance of, for example, 350 mm and an adjacent long hole. The other leg is provided with two countersunk holes for 5.0 mm countersunk screws. The supporting angle 73 has several functions such as acting as tilt prevention in high configurations (2.10 m or higher), in connection with a shelf angle 74 for securing carcasses mounted to a wall as shelf, for fixing bag stacker plates on screens 50, or as plate support.

Figure 26:
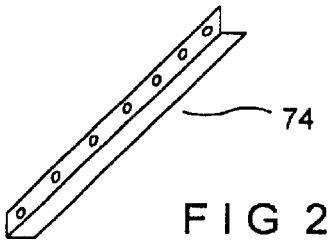
FIG. 26 shows a shelf angle.

The shelf angle 74 is shown in FIG. 26. It consists of a standard angle profile with countersunk holes for wall mounting. The components 1, 2, 3 are simply placed onto the angle and then secured against tilting by a supporting angle 73.

Figure 27:
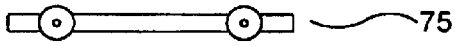
FIG. 27 shows a handle for component joining.

The steel handle 75 shown in FIG. 27 may be used to join two components 1, 2, 3 in a front-to-front manner and to move them safely and space-saving using the roller coasters 57. The steel handle 75 is a standard handle with the distance between the two threads being modified to the system measure of 350 mm.

Figure 28:
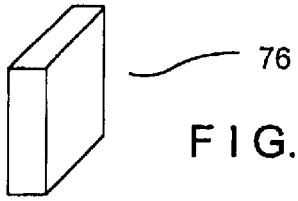
FIG. 28 shows a steel rear wall.

A steel rear wall 76 for the components 1, 2, 3 as shown in FIG. 28 is made of a square perforated sheet metal plate which is edged at a projection of, for example, 150 mm. Such wall may be provided with a passage for a cable duct. These rear walls may be variably used in open carcasses and be fixed with screws in the hole row 41. This makes it possible to accommodate even deeper devices such as monitors, printers or CPVs in the carcasses.

Figure 29:
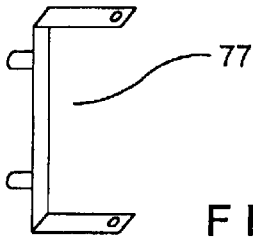
FIG. 29 shows a screen connector.

The component-screen connectors 77 according to FIG. 29 consist of U-shaped angled sheet metal provided with holes for fixing them onto the system holes 4 plus two steel cylinders having interior threads onto which a screen 50 may be centrically screwed.

Figure 30:
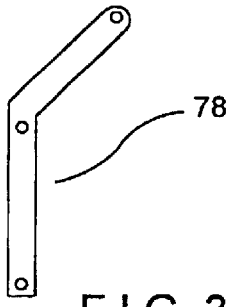
FIG. 30 shows a sliding aid for components mounted on coasters.

The sliding aid 78 according to FIG. 30 is a sheet metal having two holes for fixing it onto the system holes 4 and an extension at a 45° angle being provided with an end hole for being joined with a round wooden handle. Two sliding aids 78 and a handle are needed for constructing an office caddy.

Figure 31:
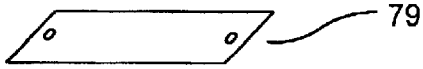
FIG. 31 through 36 show basic modules of desk plates.
Figure 32:
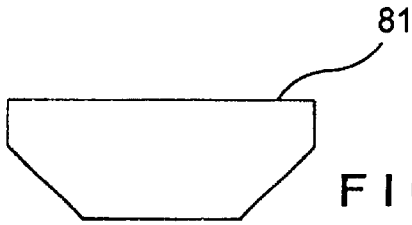
Figure 33:
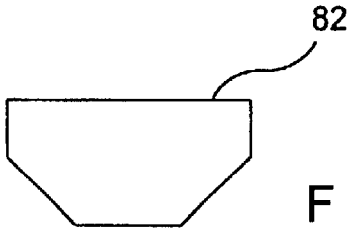
Figure 34:
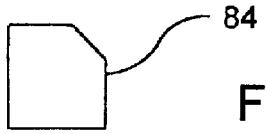
Figure 35:
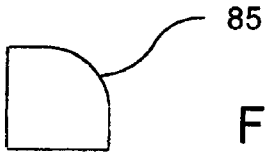
Figure 36:
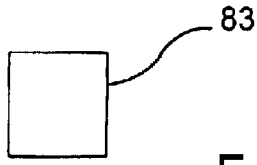

The component connector 79 according to FIG. 31 consists of a sheet metal having two holes at the system distance of 350 mm. It serves to join two components 1, 2, 3 via the system holes 4 being arranged at one level and as anti-torsion element.

The table system as part of the furniture system comprises five basic modules shown in FIGS. 32 through 36: the two desk boards 81, 82 having different widths, for example 2.10 m and 1.70 m, and the three side desk boards 83, 84 and 85 dimensioned at, for example, 0.7 m×0.7 m, having a face 84 or an arc 85. The structure of the boards is basically the same. The desk boards consist of a sandwich board 80 as has been explained earlier.

The system allows later and frequent changes between the office room forms and also adapts to combined room systems, business clubs, team or project bureaus and the 30 like. The cabinet system is also suitable for designing reception areas, technical equipment housings, archives, pyramids, suspended systems, towers, counters, passages, room dividers, media facilities and many more.

The system holes 4 and the system threads 5 allow a precisely fitting and unrestricted combination of the components 1, 2, 3 with each other and with additional elements. A high precision level of all dimensions is required and achieved.

In the cabinet system, it is possible among other things

- to fix cable ducts 21, 22, 24, 25 vertically or horizontally for interior or exterior angles,
- to place the components as desired on height adjustment screws 14 with the adjustment elements positioned inside the cabinet, on bases or footpieces,
- to place lamps 19,
- to fix acoustic rear walls 58, pinboards and magnetic walls,
- to fix wardrobe bars and hooks,
- to join it with high desk tops 59,
- to join it with screens 50 (even or curved),
- to fix separating or cover panels 46, 48 as desired,
- to insert slanting compartment bottom plates 39,
- to fix separating and end blinds and duplications of different sizes to lead or cover cables of any kind and/or to respond to the building conditions.

In particular, easy disassembly and any modifications of all properties as desired are possible without damaging or altering the system.

The present invention is not limited to the embodiments described herein. It is of course possible to implement further example embodiments by combining the features without exceeding the scope of this invention.

| Reference List | |
|---|---|
| 1 | Component |
| 2 | Component |
| 3 | Component |
| 4 | System hole |
| 5 | System thread |
| 6 | Rear wall |
| 7 | Rear wall |
| 8 | Rear wall |
| 9 | Support material |
| 10 | Coating |
| 11 | Sleeve nuts |
| 12 | Cover screw |
| 13 | Short connecting screw |
| 14 | Height adjustment screw |
| 15 | Steel compartment bottom plate |
| 16 | Steel compartment bottom plate |
| 17 | Compartment bottom plate support |
| 18 | Miter cut |
| 19 | Lamp |
| 20 | Footpiece |
| 21 | Cable duct |
| 22 | Cable duct |
| 23 | Long connecting screw |
| 24 | Cable duct |
| 25 | Cable duct |
| 26 | Revolving door |
| 27 | Revolving glass door |
| 28 | Drawer module |
| 29 | Drawer module |
| 30 | Paired revolving door |
| 31 | Paired revolving glass door |
| 32 | Blind |
| 33 | Revolving door |
| 34 | Hinged door |
| 35 | Blind |
| 36 | Paired revolving door |
| 37 | Paired revolving glass door |
| 38 | Blind |
| 39 | Slanting compartment bottom plate |
| 40 | Blind steel compartment bottom plate |
| 41 | Hole row |
| 42 | Reversible footpiece |
| 43 | Steel base plate |
| 44 | Passage hole |

-continued

| Reference List | |
|---|---|
| 45 | Adjusting foot |
| 46 | Glass cover plate |
| 47 | Screw |
| 48 | Cover panel |
| 49 | Bond-in bushing |
| 50 | Screen |
| 51 | Connecting thread |
| 52 | Footpiece thread |
| 53 | System coat hanger |
| 54 | Steel bottom plate |
| 55 | Passage hole |
| 56 | Round steel bar |
| 57 | Roller coaster |
| 58 | Acoustic rear wall |
| 59 | High desk top |
| 60 | Door stop |
| 61 | Handle |
| 62 | Key handle |
| 63 | Upper plate |
| 64 | Lower plate |
| 65 | Adhesive layer |
| 66 | Hole |
| 67 | Head milling |
| 68 | Push-in bushing |
| 69 | Base |
| 70 | Three-hole arrangement |
| 71 | CPU stand |
| 72 | Drawing roll support |
| 73 | Supporting angle |
| 74 | Shelf angle |
| 75 | Steel handle |
| 76 | Steel rear walls |
| 77 | Component-screen connector |
| 78 | Sliding aid |
| 79 | Component connector |
| 80 | Sandwich board |
| 81 | Desk board |
| 82 | Desk board |
| 83 | Side desk board |
| 84 | Side desk board |
| 85 | Side desk board |
| D | Depth |
| H1, | H2, H3 Height |
| B1, | B2, B3 Width |

What is claimed is:

1. A modular cabinet system comprising:

a plurality of modules, each module having a top wall, a bottom wall, a first side wall, and a second side wall, said walls of each module being permanently fixed to each other and made of a multiplex material;

each module having dimensions chosen from one of the following: <a first size having dimensions height (H), width (W) and depth (D), wherein H, W and D are equal, a second size having dimensions H, 2*W and D, a third size having dimensions 2*H, W and D; and a fourth size having dimensions 2*H, 2*W and D each of said walls with a dimension H or W having one system hole and each of said walls with a dimension 2*H or 2*W having two spaced-apart system holes; and said bottom wall further having four spaced-apart threaded through-holes;

said side and top walls being free of threaded through-holes, said modules being positioned adjacent to one another in a side-to-side or top-to-bottom orientation so that at least one system hole of each module is axially aligned with at least one system hole of an adjacent module;

each of said modules being secured to each adjacent module by fastening means through said at least one axially aligned system hole.

2. The modular cabinet system of claim 1 wherein the modules can be attached to another module at any of said walls of said module.

3. The modular cabinet system of claim 1 further comprising at least one or a combination of attachable components comprising cable ducts, lamps, bases, adjusting feet, rolling coasters, acoustic rear walls, wardrobe bars, slanting compartment bottom plates, screens, high desk tops, or cover panels wherein each of said components have system holes positioned so that said system holes of said components are axially aligned with the system holes of said modules for securing said components to said modules.

4. The modular cabinet system of claim 1 wherein the threaded through-holes further comprise riveted bushings.

5. The modular cabinet system of claim 1 wherein the walls are mitred at their edges and joined together by angular dowels.

6. The modular cabinet system of claim 1 further comprising a table board having a sandwich board with an upper plate and a lower plate bonded by an adhesive, whereby said lower plate has holes and matching head millings arranged and constructed so that standard push-in bushings may be driven into said holes of said lower plate, said table board being positioned on the top wall of one of said modules so that at least one system hole of said top wall is axially aligned with at least one bushing of said lower plate, said table board secured to said top wall of said module by fastening means through said at least one axially aligned system hole and bushing.

7. The modular cabinet system of claim 1 wherein the module further comprises a plurality of horizontal rows of small holes drilled partly into at least two opposing walls and at least one door stop fixed to one of said opposing walls, whereby said plurality of horizontal rows correspond to variable positioning of said door stops to accommodate doors of different thicknesses.

8. The modular cabinet system of claim 7 wherein said door stops further comprise a rubber piece having a plurality of passage holes.

9. The modular cabinet system of claim 1 further comprising a footpiece having a base plate, a number of system holes for fixing said footpiece onto said threaded through-holes, and two independently adjustable feet positioned axially offset from said system holes whereby said footpiece is adjustable to achieve varying heights.

10. The system of claim 1, wherein D is approximately 350 mm.

11. The system of claim 1, wherein each system hole is located at a distance ½D from a front edge of a module, and ½D from at least one side edge of a module.

12. The system of claim 1, wherein said modules are of at least two different sizes.

13. The system of claim 1, wherein each system hole is a distance ½ H or ½ W from a nearest longitudinal edge of a wall on which said hole resides.

* * * * *